United States Patent [19]

Fukumoto

[11] Patent Number: 4,586,144

[45] Date of Patent: Apr. 29, 1986

[54] PIPING SYSTEM SURVEILLANCE APPARATUS

[75] Inventor: Akira Fukumoto, Yokohama, Japan

[73] Assignee: Tokyo Shibaura Denki Kabushiki Kaisha, Kawasaki, Japan

[21] Appl. No.: 513,388

[22] Filed: Jul. 13, 1983

[30] Foreign Application Priority Data

Jul. 16, 1982 [JP] Japan ............................... 57-123975

[51] Int. Cl.[4] ................................................ G01F 9/00

[52] U.S. Cl. .................................... 364/510; 340/500; 364/550

[58] Field of Search ............... 364/510, 509, 148, 527, 364/500, 492, 550; 137/119, 101.19, 88, 89, 255, 256; 376/243, 244, 245, 246, 247, 250; 340/500, 506, 507; 73/861

[56] References Cited

U.S. PATENT DOCUMENTS

| | | | |
|---|---|---|---|
| 4,180,083 | 12/1979 | Miyaoka et al. | 137/255 |
| 4,200,864 | 4/1980 | Gillet et al. | 376/215 |
| 4,200,911 | 4/1980 | Matsumoto | 364/510 |
| 4,236,220 | 11/1980 | Kogami et al. | 376/217 |
| 4,330,367 | 5/1982 | Musick | 376/245 |
| 4,353,118 | 10/1982 | Heimgartner et al. | 364/510 |
| 4,459,259 | 7/1984 | Colley | 364/492 |

*Primary Examiner*—Errol A. Krass

*Attorney, Agent, or Firm*—Oblon, Fisher, Spivak, McClelland & Maier

[57] ABSTRACT

A piping system surveillance apparatus has a CRT for displaying a graphic pattern of a piping system. Detectors are arranged in active construction members such as a valves, and pumps of the piping system so as to directly detect the presence/absence of fluid flow in the active construction members in accordance with operating conditions thereof. The presence/absence information of the fluid flow in non-active construction members is obtained by a CPU in accordance with logic operation of detection signals from the detectors. Data indicating the presence/absence of the fluid flow is compared with data indicating the presence/absence of the fluid flow in the construction members of the piping system in normal operation and is discriminated to be normal/abnormal. This discrimination result and the data indicating the presence/absence of actual fluid flows are displayed by the corresponding display elements of the graphic pattern on the CRT.

7 Claims, 5 Drawing Figures

| ITEM | STATE SIGNAL Si | FLAG SIGNAL Fi | DISPLAY PATTERN |
|---|---|---|---|
| VALVE | 1 | 0 |  (CYAN) |
| | | 1 |  (RED) |
| | 0 | 0 |  (CYAN) |
| | | 1 |  (RED) |
| PUMP | 1 | 0 |  (CYAN) |
| | | 1 |  (RED) |
| | 0 | 0 |  (CYAN) |
| | | 1 |  (RED) |
| PIPE | 1 | 0 |  (CYAN) |
| | | 1 |  (RED) |
| | 0 | 0 |  (CYAN) |
| | | 1 |  (RED) |

PIPING SYSTEM SURVEILLANCE APPARATUS

BACKGROUND OF THE INVENTION

1. Field of the Invention

The present invention relates to a piping system surveillance apparatus for monitoring the condition of various piping systems in boiler equipment of a thermal power plant or nuclear reactor equipment of a nuclear power plant.

2. Discussion of the Background

In general, in boiling water reactor equipment, piping systems are installed for a reactor recirculation system, a low-pressure core spray system, a high-pressure core spray system, a reactor core isolation cooling system and so on. These piping systems are constituted by pipes, pumps and valves. Reactor water as a cooling medium is supplied to a reactor pressure vessel through these piping systems.

Conventionally, the operating condition of the piping system is checked in the following manner. Control switches and indicator lamps for indicating the operating condition of the valves, pumps and pipes constituting the piping system are disposed in a central control room of a reactor plant. Personnel check the condition of these indicator lamps and control switches to judge whether or not each piping system is working properly. According to such a surveillance system, a great number of valves and pumps of each piping system must be individually monitored. Furthermore, the indicator lamps and control switches in the central control room are distributed among several locations of the central control room. It takes a long time for personnel to check these indicator lamps and control switches. Furthermore, personnel may erroneously confirm the operating condition of the indicator lamps and control switches.

SUMMARY OF THE INVENTION

It is, therefore, an object of the present invention to provide a piping system surveillance apparatus which allows visual monitoring of operating conditions of a piping system in a centralized manner.

In order to achieve the above object of the present invention, there is provided a piping system surveillance apparatus comprising: a display section for displaying a graphic pattern indicating a piping system; detectors for directly detecting the presence or absence of a fluid in active construction elements of the piping system in accordance with operating conditions of the active construction elements; an operation circuit for detecting the presence or absence of the fluid in nonactive construction elements by digital-processing detection signals from the detectors; and a comparator for comparing fluid presence/absence data obtained by the detectors and the operation circuit with fluid presence/absence data in normal operation of the piping system and for discriminating normal/abnormal operation of active and non-active construction elements, wherein a display form of display elements of the graphic pattern displayed at the display section is changed in accordance with the fluid presence/absence data and a discrimination result.

DETAILED DESCRIPTION OF THE PREFERRED EMBODIMENT

Figure 1:
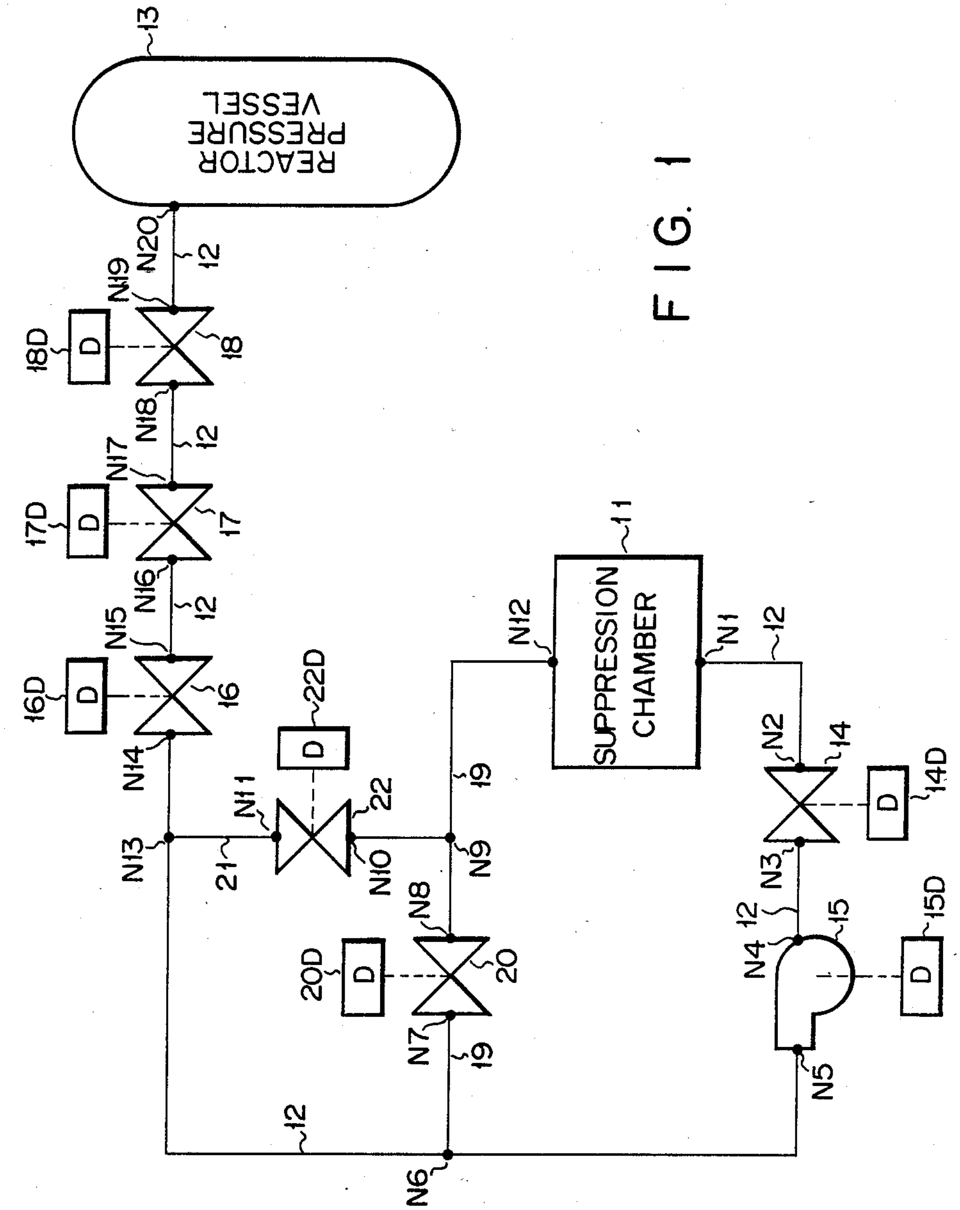
FIG. 1 shows a schematic configuration of a piping system to be monitored by a piping system surveillance apparatus according to an embodiment of the present invention.

FIG. 1 shows a low pressure core spray system (LPCS) as one of several piping systems for nuclear reactor equipment. A suppression chamber 11 for storing water communicates with one end of a main pipe 12. The other end of the main pipe 12 communicates with a reactor pressure vessel 13. A valve 14, a pump 15, an injection valve 16, a check value 17 and a manual injection valve 18 are disposed along the main pipe 12 from the upstream side thereof. A portion of the main pipe 12 which is located at the downstream side of the pump 15 is branched by a minimum flow pipe 19. The minimum flow pipe 19 communicates with the suppression chamber 11. A minimum flow valve 20 is disposed in the minimum flow pipe 19. A portion of the minimum flow pipe 19 which is located downstream of the minimum flow valve 20 and a portion of the main pipe 12 which is located upstream of the injection valve 16 communicate with each other through a test pipe 21. A valve 22 is disposed in the pipe 21. Detectors 14D, 16D, 17D, 18D, 20D, 22D and 15D are disposed in the valves 14, 16, 17, 18, 20 and 22 and the pump 15, respectively, to detect flow/nonflow of the fluid. The detectors detect the opening/closing of the valves and rotation of the pump so as to detect flow/nonflow of the fluid.

Figure 2:
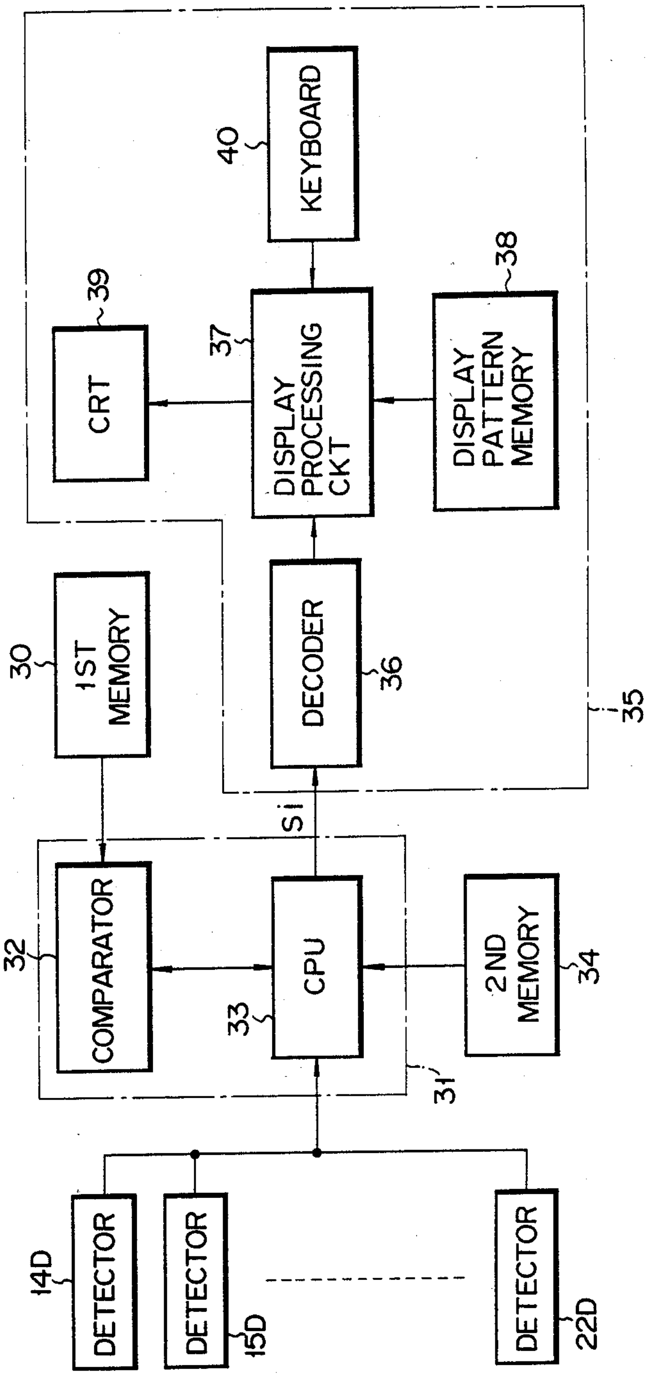
FIG. 2 is a block diagram of the piping system surveillance apparatus of the present invention.

A piping system surveillance apparatus is installed to monitor operating conditions of the LPCS, as shown in FIG. 2. Referring to FIG. 2, an output of a first memory 30 is connected to a comparator 32 of a processing circuit 31. The comparator 32 is connected to a CPU 33. An input of the CPU 33 is connected to the detectors 14D to 18D, 20D and 22D, and to a second memory 34. An output of the CPU 33 is connected to a display section 35.

The first memory 30 stores data corresponding to elements Ei (i=1 to 20) obtained by dividing the piping system by imaginary nodes Ni (i=1 to 20) disposed in the piping system (FIG. 1) in a relationship as shown in Table 1 below.

TABLE 1

| Interval defined by nodes Ni | Elements Ei |
|---|---|
| N1-N2 | E1 |
| N2-N3 | E2 |
| N3-N4 | E3 |
| N4-N5 | E4 |
| N5-N6 | E5 |
| N6-N7 | E6 |
| N7-N8 | E7 |
| N8-N9 | E8 |
| N9-N10 | E9 |
| N10-N11 | E10 |
| N11-N13 | E11 |
| N9-N12 | E12 |
| N13-N14 | E13 |
| N14-N15 | E14 |
| N15-N16 | E15 |
| N16-N17 | E16 |
| N17-N18 | E17 |

TABLE 1-continued

| Interval defined by nodes Ni | Elements Ei |
|---|---|
| N18–N19 | E18 |
| N19–N20 | E19 |
| N6–N13 | E20 |

When the fluid (i.e. water) flows through these elements Ei, the elements are designated to be binary "1". Otherwise, the elements are designated to be binary "0". A signal INi indicating normal conditions of the LPCS is stored in the first memory 30.

The second memory 34 stores data indicating logic operation formulae for determining the logic level of those elements which do not allow direct detection of fluid flow therethrough. The logic operation formula is formed in accordance with the following rules:

(1) when the logic level of an element can be directly detected by one of detectors D, the state of this element is determined in accordance with the state of the detection signal from this detector D;

(2) when the state of an element cannot be directly detected, the state is determined by a condition of a portion upstream of this element;

(3) in rule (2), when upstream elements are connected in series to each other, the state of the element to be detected is determined in accordacne with a logic product of an upstream element having a state directly detected by a corresponding detector and a further upstream element;

(4) in rule (2), when upstream elements are connected in parallel to each other, the state of each of the upstream elements is determined in accordance with a logic sum of these upstream elements; and (5) an element having a constant state is designated to be either binary "1" or "0".

Logic formulae for determining the states of the elements Ei in accordance with the above rules are shown in Table 2. In Table 2, logic Ii designates a detection signal indicating the state of an element Ei (binary signal from the detector D); reference symbol X denotes a logic product; and +, a logic sum.

TABLE 2

| Element name | Element state signal | Logic formulae fi |
|---|---|---|
| E1 | S1 | 1 |
| E2 | S2 | I1 |
| E3 | S3 | I1 × S1 |
| E4 | S4 | I2 |
| E5 | S5 | I2 × S3 |
| E6 | S6 | S5 |
| E7 | S7 | I3 |
| E8 | S8 | I3 × S7 |
| E9 | S9 | I4 × S11 |
| E10 | S10 | I4 |
| E11 | S11 | S20 |
| E12 | S12 | S8 + S9 |
| E13 | S13 | S20 |
| E14 | S14 | I5 |
| E15 | S15 | I5 × S14 |
| E16 | S16 | I6 |
| E17 | S17 | I6 × S16 |
| E18 | S18 | I7 |
| E19 | S19 | I7 × S18 |
| E20 | S20 | S5 |

The output port of the CPU 33 of the processing section 31 is connected to a decoder 36 of the display section 35. An output of the decoder 36 is connected to a display processing circuit 37. The display pattern signal input port of the display processing circuit 37 is connected to a display pattern memory 38. The display pattern signal output port thereof is connected to a CRT 39. The control input of the display processing circuit 37 is connected to a keyboard 40.

The display pattern memory 38 stores binary coded data of a set of display patterns (indicating various piping systems) to be displayed on the CRT 39. Each display pattern comprises a plurality of display elements which are divided into static display elements and dynamic display elements. The dynamic display elements are further divided into equipment-state display elements and process parameter display elements. Once the static display elements are displayed, they need not be further updated. For example, the static display elements indicate a display element number, a display pattern, a display color, a display position, and so on. The equipment-state display elements indicate conditions of a tube, a valve, a pump and so on. The process parameter display elements indicate values or bar charts of a temperature, a pressure and so on.

The operation of the piping system surveillance apparatus according to the embodiment of the present invention will now be described.

Figure 3:
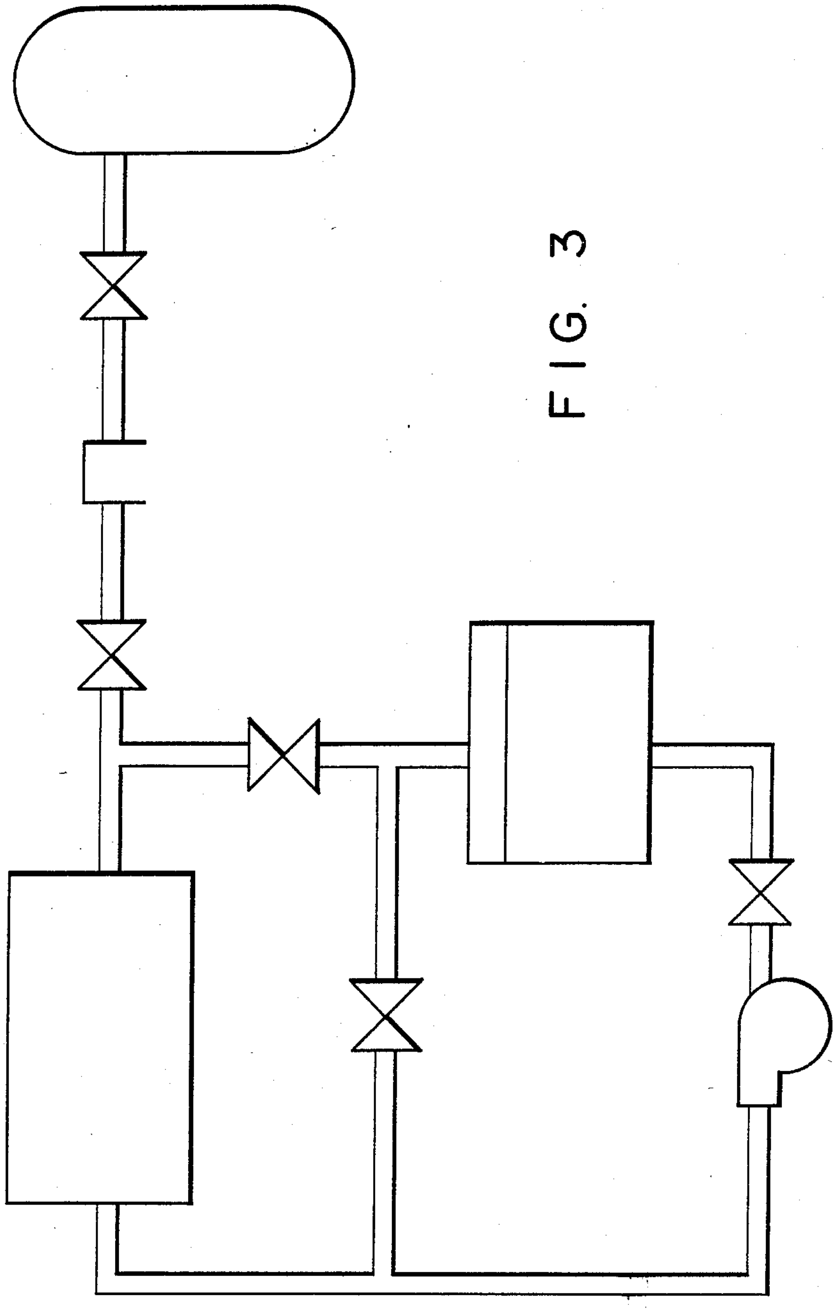
FIG. 3 is a diagram showing a static display pattern of the piping system.

When the operator selects an LPCS from various piping systems at the keyboard 40, the display processing circuit 37 reads out static pattern information of the LPCS pattern from the display pattern memory 38. The LPCS static pattern information is transferred to the CRT 39, and the LPCS static pattern is displayed on the CRT 39, as shown in FIG. 3. The CPU 33 then reads out as a state signal "S1" logic formula data fi (i.e., constant "1" shown in Table 2) corresponding to the element E1. The constant "1" indicates that the state of the element E1 is always constant. The signal S1 is supplied to the comparator 32 and is compared with INi (i=1) (e.g., constant "0") read out from the first memory 30. In this case, S1 ≠IN1, so that the comparator 32 supplies to the CPU 33 a signal which indicates abnormal operation of the LPCS. However, if S1=IN1, the comparator 32 supplies to the CPU 33 a signal which indicates normal operation of the LPCS. In response to the abnormal or a normal state signal, the CPU 33 stores an abnormal or a normal flag signal Fi=1 or Fi=0 together with the element state signal Sl in the memory thereof. Subsequently, the CPU 33 fetches as an element state signal S2 logic formula data fi=I1 corresponding to the element E2. The data I1 is supplied directly from the detector 14D to the CPU 33. The data Il is supplied to and compared by the comparator 32 with a corresponding signal IN2 from the first memory 30. If S2 ≠IN2, the CPU 33 stores the abnormal flag signal Fi=1 together with the signal S2 in the memory thereof. However, if S2 =IN2, the CPU 33 stores the normal flag signal Fi=0 together with the signal S2 in the memory thereof. Subsequently, the CPU 33 fetches logic formula data I1×S1 corresponding to the element E3 and performs logic operation of the formula I1×S1. The CPU 33 then supplies an element state signal S3 to the comparator 32. The comparator 32 compares the signal S3 with a corresponding signal IN3 supplied from the first memory 30. The memory of the CPU 33 stores the signal S3 together with the abnormal or normal flag signal Fi=1 or 0 in accordance with the comparison result.

Figure 4:
FIG. 4 is a table showing display patterns indicating individual elements.
Figure 4:
Figure 4:
Figure 4:
Figure 4:
Figure 4:
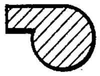
Figure 4:
Figure 4:
Figure 4:
Figure 4:
Figure 4:
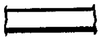
Figure 4:
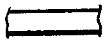

Logic operation is performed in accordance with logic formula data respectively corresponding to the elements E1 to E20. Digital signals respectively corresponding to the elements E1 to E20 are processed. Signal processing continues until all the results are stabilized. When signal processing is stabilized, the CPU 33 sequentially transfers data Fi (=1 to 20) to the decoder 36 of the display section 35. The decoder 36 determines a display pattern in accordance with the signals Si and Fi. FIG. 4 is a table showing the display patterns obtained by various combinations of signals Si and Fi. In the display patterns shown in FIG. 4, a solid display symbol or element is designated when Si=1, and a hollow display symbol is designated when Si=0. Furthermore, in the solid display symbols, cyan is designated when Fi=0, and red is designated when Fi=1.

When the signals Si=1 and Fi=0 for the element E1 are supplied to the decoder 36, the decoder 36 supplies display data indicating cyan to the display processing circuit 37. The display processing circuit 37 supplies a signal to the CRT 39 so as to display the element E1 (i.e., a portion of the main pipe 12 which is located between the suppression chamber 11 and the valve 14) in cyan. Similarly, when the signals Si=1 and Fi=0 for the element E2 (valve 14) are supplied to the decoder 36, the decoder 36 supplies to the display processing circuit 37 display data for displaying the element E2 in cyan. As a result, the display element corresponding to the valve 14 is displayed in cyan on the CRT 39.

Figure 5:
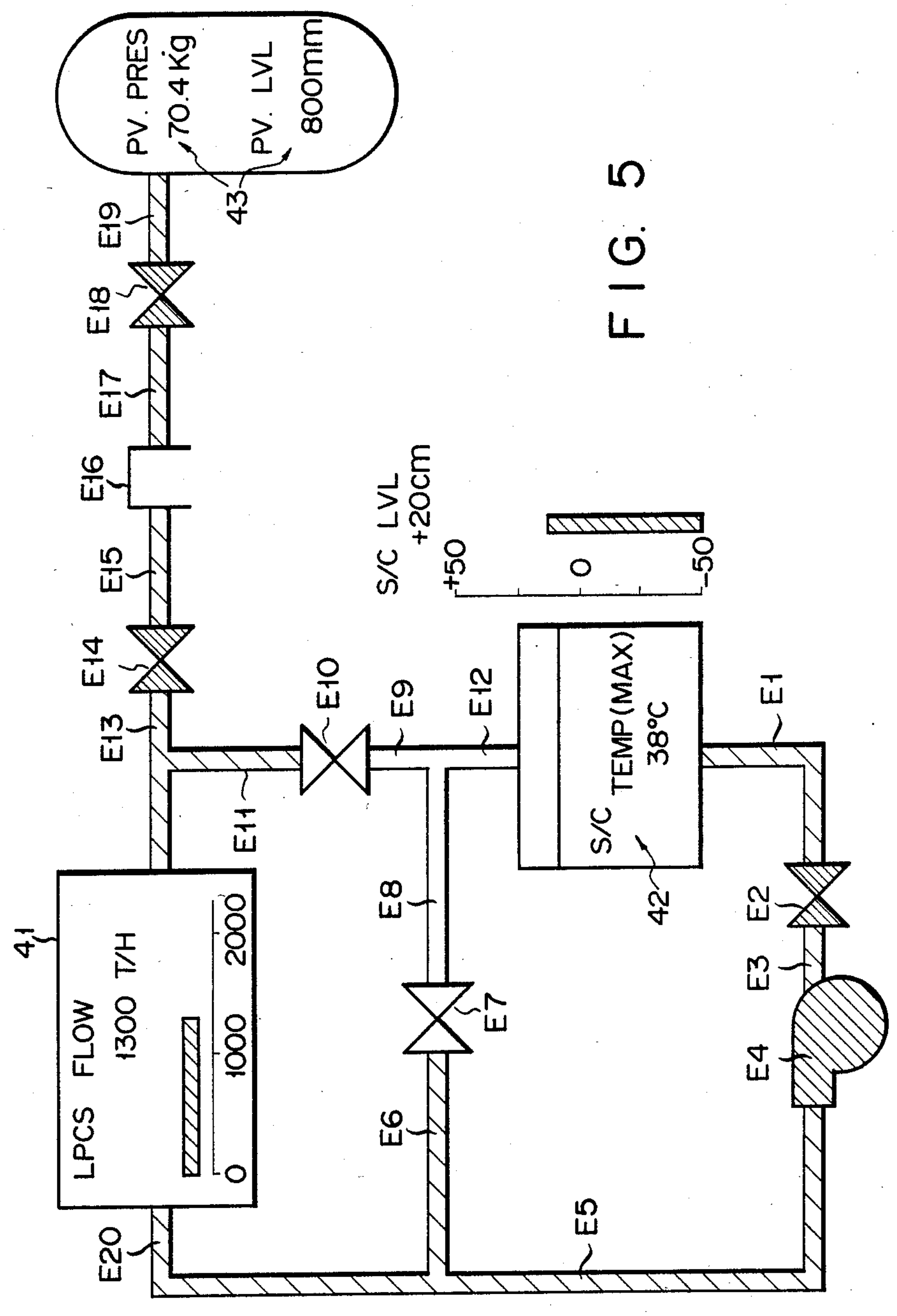
FIG. 5 is a diagram showing the pattern of the piping system which is displayed on a CRT.

When all the display patterns corresponding to the elements E1 to E20 are designated and displayed on the CRT 39, all equipment-state display elements of the dynamic display elements are displayed. However, in order to perform process parameter display, data from the sensors or detectors arranged at predetermined positions of the piping system must be processed. For example, the detectors for detecting the water level, pressure and so on are arranged in the reactor 13, and detectors for detecting a water level, a water temperature, and so on are arranged in the suppression chamber 11. Furthermore, a flowmeter and the like are arranged in the main pipe 12. When data from these detectors or sensors are supplied to the CPU 33, the CPU 33 calculates the water level, the pressure, the water temperature, the flow rate, etc. in accordance with these data. The values calculated by the CPU 33 are supplied to the display processing circuit 37 through the decoder 36. The display processing circuit 37 processes the signals from the CPU 33 so as to display the values corresponding to the calculated values within the display pattern on the CRT 39. As shown in FIG. 5, a character size, a word length, a word position and so on are determined to display predetermined values in display areas 41, 42 and 43, respectively. On the other hand, if the personnel wish to display the calculated values as a bar chart, signal processing is performed such that the calculated values properly correspond with a scale and display bars.

According to the piping system surveillance apparatus of the present invention, the piping system is displayed as a graphic display pattern on the screen. The display pattern is constituted of display elements respectively corresponding to a plurality of elements of the piping system. The display modes (e.g., solid display, hollow display, and multicolor display) of the display elements change in accordance with the elements constituting the piping system. The personnel can visually and immediately understand the operating conditions of the elements of the piping system in accordance with the pattern displayed on the screen of the surveillance apparatus.

In the above embodiment, the piping system surveillance apparatus monitors the LPCS. When the personnel wish to monitor another piping system, they enter data at the keyboard to select the desired piping system, thereby reading out the static pattern of the desired piping system and displaying it on the CRT. Therefore, this piping system can be monitored in accordance with the corresponding displayed pattern. The pattern of the piping system to be monitored can be automatically read out from the pattern memory in accordance with a piping system designation signal and can be displayed on the CRT.

In the above description, the present invention is embodied by a piping system surveillance apparatus for a nuclear power plant. However, the present invention may also be applied to any other plant such as a thermal power plant.

What is claimed is:

1. A piping system surveillance apparatus for surveilling a piping system including a plurality of active element means said active element means being moving elements and a plurality of non-active elements said non-active elements being non-moving elements comprising:

first memory means for storing data indicating whether or not fluid is flowing in said active elements constituting a piping system when the piping system is normally operated;

detecting means arranged in at least one of said active elements so as to directly detect a presence or absence of fluid flow on at least one of said active elements and to generate a signal corresponding to the presence or absence of the fluid flow;

second memory means for storing logic formula data for determining a state of at least one of said non-active elements which does not have said detecting means, from the output signal obtained from said detecting means;

data processing means for processing the output signal obtained from said detecting means and the logic formula data read out from said second memory so as to prepare data indicating the presence or absence of the fluid flow with respect to said active element and data indicating the presence or absence of the fluid flow with respect to at least one of said non-active elements;

discriminating means for comparing the data obtained from said data processing means with the data read out from said first memory means, for discriminating normal/abnormal operation in accordance with the data obtained from said data processing means, and for generating discrimination data; and displaying means having a graphic pattern including display elements corresponding to said elements of said piping system for selectively displaying said display elements in accordance with the data indicating the presence/absence of the flow and the discrimination data.

2. An apparatus according to claim 1, wherein said detecting means comprises means arranged in said active element means of the piping system so as to directly detect the operating condition of said active elements.

3. An apparatus according to claim 1, wherein said detecting means generates a binary signal indicating the presence/absence of the fluid flow.

4. An apparatus according to claim 1, wherein said first memory means stores data indicating the presence of the fluid flow as binary "1" and the absence of the fluid flow as binary "0".

5. An apparatus according to claim 1, wherein said discriminating means comprises means for generating first data indicating an abnormal operation when the data from said first memory means does not coincide with the data from said data processing means, and for generating second data indicating a normal operation when the data from said first memory means coincides with the data from said data processing means.

6. An apparatus according to claim 1, wherein said displaying means comprises pattern memory means for storing pattern information corresponding to the graphic pattern of the piping system, readout means for reading out the pattern information from said pattern memory means, a display member for displaying the pattern information as the graphic pattern of the piping system, and means for changing a display mode of the display elements of the graphic pattern in accordance with the data indicating the presence/absence of the fluid flow and the discrimination data.

7. An apparatus according to claim 1, wherein said pattern memory means stores a plurality of graphic information respectively corresponding to graphic patterns of various piping systems and selectively reads out the graphic information.

* * * * *